March 18, 1924.
G. C. GROENEVELD
BRUSH RAKE
Filed July 29, 1922
1,487,559
2 Sheets-Sheet 2
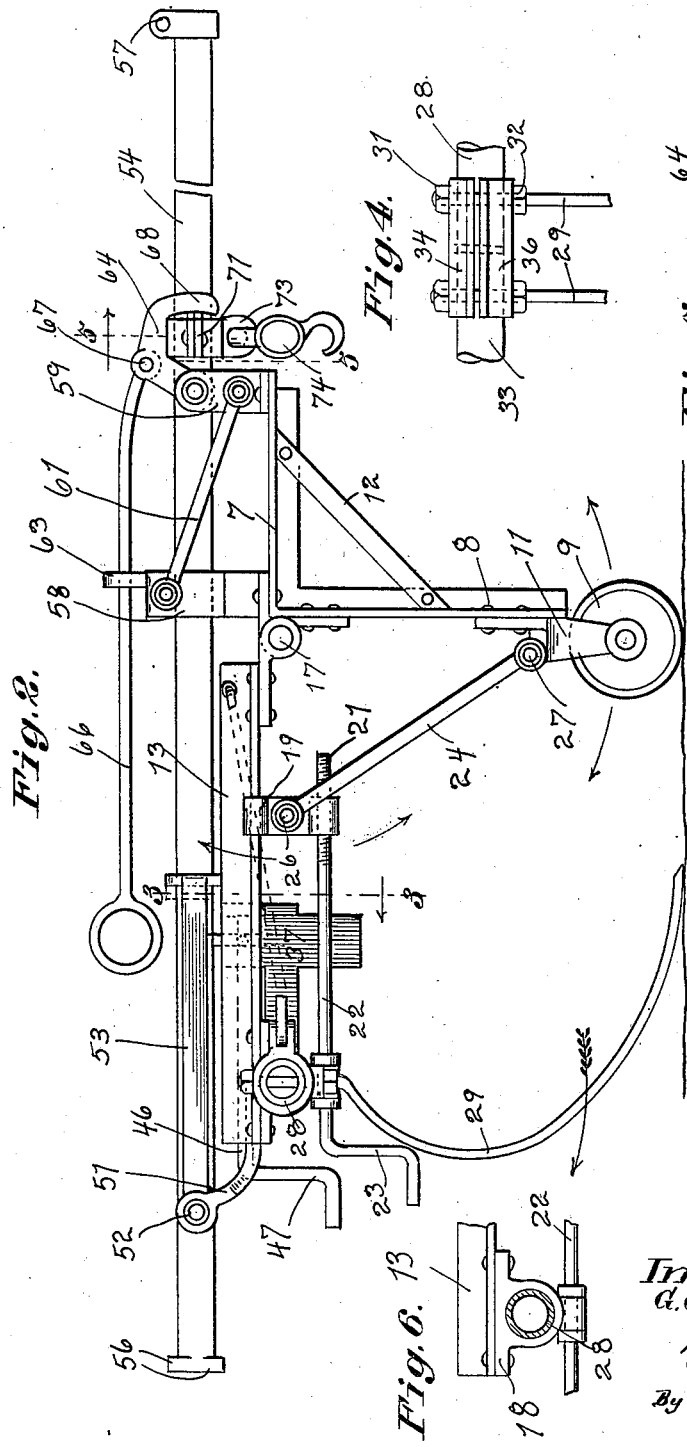
Inventor.
G. C. Groeneveld.
Victor J. Evans
By Attorney Patented Mar. 18, 1924.

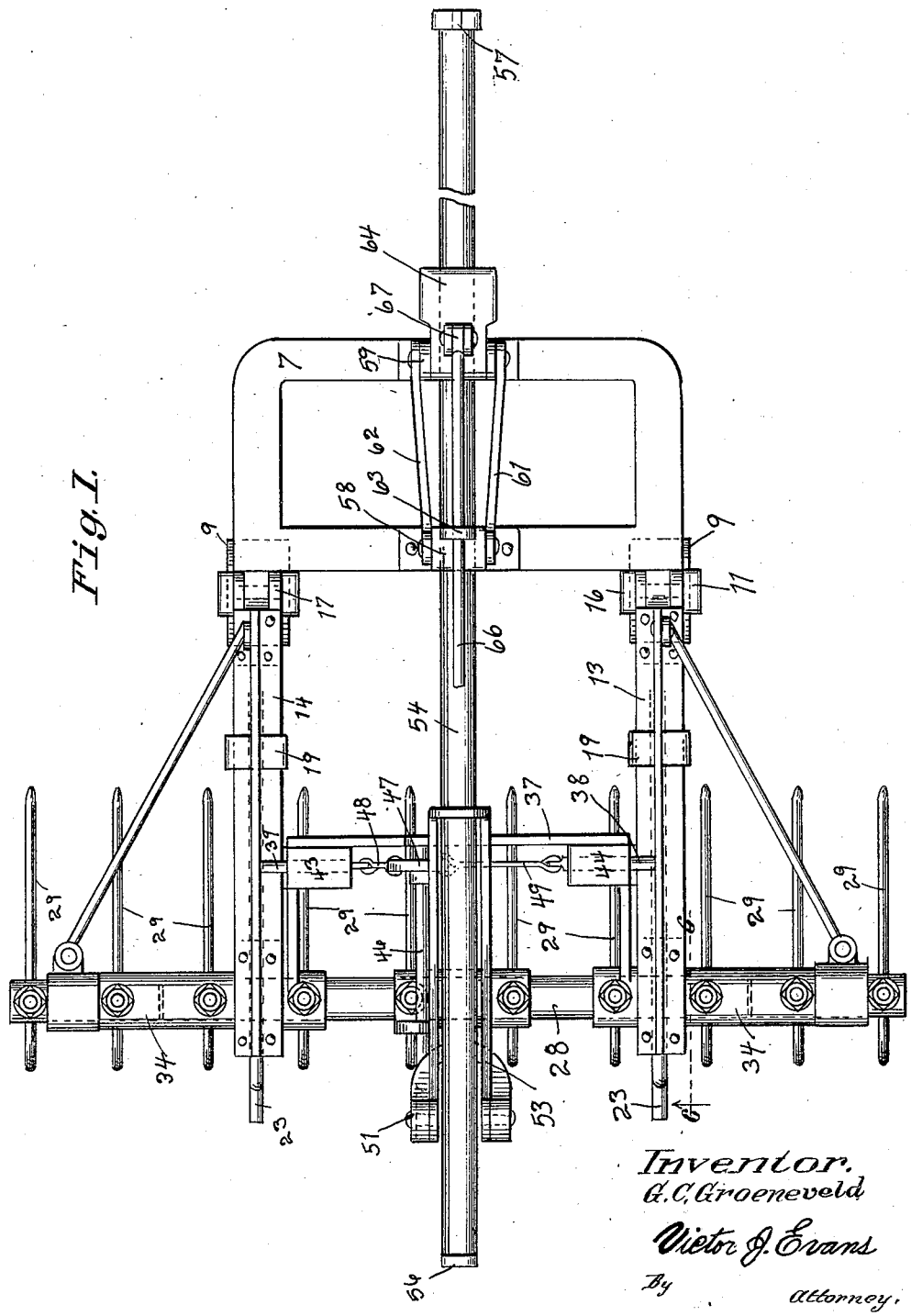

1,487,559

UNITED STATES PATENT OFFICE.

GOVERT C. GROENEVELD, OF HANFORD, CALIFORNIA.

BRUSH RAKE.

Application filed July 29, 1922. Serial No. 578,445.

*To all whom it may concern:*

Be it known that I, GOVERT C. GROENEVELD, a citizen of the United States, residing at Hanford, in the county of Kings and State of California, have invented new and useful Improvements in Brush Rakes, of which the following is a specification.

This invention relates to improvements in brush rakes, and particularly that type of rake which is adapted to be either horse or tractor drawn for the purpose of gathering brush between rows of vines and the like.

Another object is to provide means whereby the rake may be extended to accommodate for different widths between the rows of vines.

A further object is to provide means whereby the drawing element of the rake may be extended thereby permitting the rake to be drawn over a fire without injury to either horse or tractor.

A still further object is to provide means whereby the rake may be easily adjusted as to depth.

Other objects and advantages will be apparent during the course of the following description.

In the accompanying drawings forming a part of this specification, and in which like numerals are employed to designate like parts throughout the same, Figure 1 is a top plan view of my improved rake, Figure 2 is a side elevation of Figure 1, Figure 3 is a cross-section taken on the line 3—3 of Figure 2 looking in the direction of the arrow, Figure 4 is a fragmentary detail view of extension brake attaching means, Figure 5 is a cross-section taken on the line 5—5 of Figure 2 looking in the direction of the arrow, and Figure 6 is a cross-section taken on the line 6—6 of Figure 1, also looking in the direction of the arrow.

In the cultivation of vines, such as grape vines, berry bushes and the like, it is necessary to trim the vines each year, and during the trimming it is customary to throw the cuttings on the ground between the rows of vines. These cuttings are later gathered and drawn to a remote point generally near the end of the rows, but at a sufficient distance not to injure the vines.

Heretofore, as far as applicant is aware, these vines have been gathered with large pitchfork and thrown into fire wagons and either burned therein or conveyed to a distant point and dumped adjacent the fire, to be later fed thereto. This process, if course, is expensive, and consequently it is to overcome this expense that I have devised my rake which is adapted to be drawn between the rows of vines so as to gather up the cuttings and transport them in contact with the rake to a point adjacent the fire at which time the drafting element is extended so that the drawing medium whether it be a horse or tractor, can proceed and then move around the fire until in a position to drag the rake over the fire. In this way, I am able to place the cuttings directly on the fire without the necessity of rehandling, and then by providing suitable extensions, I can accommodate my rake to various widths between vines.

In the accompanying drawings wherein for the purpose of illustration is shown a preferred embodiment of my invention, the numeral 7 designates a substantially rectangular frame which is provided with downwardly extending angle iron legs 8. These legs carry at their lower extremity a wheel as shown at 9 mounted in a suitable bracket 11. The customary brace 12 is provided between the rectangular frame 7 and the legs 8.

The numerals 13 and 14 refer to T shaped members pivoted as at 16 and 17 to the frame 7. These T shaped members in turn have their free ends secured to bearing blocks as best shown at 18 in Figure 6. Slidably mounted in each of the T shaped members 13 and 14 is a guide 19 engaging the head of the T shaped member so as to slide thereon. This guide is provided with a threaded bore within which is mounted the threaded end 21 of a rod 22, which rod 22 extends rearwardly and terminates in a crank handle as shown at 23. A link 24 is pivoted as at 26 to the guide 19 and is further pivoted as at 27 to the upper portion of the bracket 11. The purpose of this arrangement will be later disclosed.

At 28, I have shown a shaft, preferably tubular, which shaft is mounted in the bearing blocks 18 and extends a short distance on each side of the same. This shaft is adapted to receive therethrough the upper extremities of rake teeth 29, which are secured in any convenient manner as by nuts 31 and 32. When it is desired to add additional rake teeth the same is accomplished by providing an extension shaft 33 which is adapted to be clamped to the end of the shaft 28 as by clamping members 34 and 36 as best shown in Figure 4, where it will be noted that the same nuts which secure the rake teeth are employed to secure the clamping members.

A substantially U shaped frame 37 is secured to the shaft 28, the purpose of which is to control the movement of the shaft 28 with respect to its bearing block 18. This movement is controlled as by latches 38 and 39, the ends of which engage the T shaped members 13 and 14 as best shown in Figures 1 and 3. These latches are normally held in contact with the T shaped members as by springs 41 and 42 positioned within U shaped retainers 43 and 44 mounted upon the U shaped frame 37. The numeral 46 designates a shaft which is provided with a crank 47 journaled upon the U shaped frame 37 and has secured thereto a walking beam 47', the opposite sides of which are connected as by links 48 and 49 to eyes formed in the latches or pins 38 and 39 respectively, the result being that as the crank 47 is rotated, the pins 38 and 39 will be moved into or out of engagement with the T shaped members 13 and 14.

At 51, I have shown a bifurcated member secured to the shaft 28 to which is pivoted as at 52 a yoke 53, the forward extremity of which is so formed as to encircle a draft bar 54, which draft bar is provided at its rear end with lugs 56, as best shown in Figure 2. This draft bar extends forwardly and is provided with the usual eyes 57 for the reception of draft attaching means. At the point where the draft bar crosses the rectangular frame 7, I provide upstanding lugs on the frame 17 as shown at 58 and 59 which lugs are properly braced as shown at 61 and 62. The lug 58 carries an upstanding guide 63 while the lugs 59 have pivoted therebetween a latch 64. The movement of this latch is controlled by a rod 66 which passes through the guide 63 and is pivoted as at 67 to the latch 63. The construction of this latch is best shown in Figures 2 and 5, wherein it will be noted that the same is provided with downwardly extending fingers 68 and 69 which are adapted to straddle the draft bar 54 and to engage outwardly extending portions 71 and 72, having a clamping element secured thereto. This clamping element may also be provided with a downwardly extending lug 73 for the purpose of screwing a double tree thereto as shown at 74, when the device is used with horses.

In operation, the device as a whole is attached behind draft means which, as before stated, may be applied to horses or a tractor, and is then adjusted as to width between the vines by adding or removing rake teeth. The device is then adjusted as to depth to which the teeth must work by rotating the cranks 23, which rotation will move the guides 19 to or away from the pivots 17 with the result that the rake will be caused to move through an arc outwardly or upwardly as indicated by the arrows adjacent these guides. When the device has reached the point where the cuttings being collected are to be dumped, the rod 66 is pulled rearwardly so as to lift the fingers 68 and 69 out of engagement with the extensions 71 and 72 of the draft bar, with the result that the draft bar will then move forwardly until the lugs 56 encounter the encircling portion of the yoke 53, after which time the drawing means can proceed past the fire and then move to the opposite side thereof so that the drafting bar is directly over the fire. By then rotating the crank 47, the pins 38 and 39 will be withdrawn which will allow the U shaped frame 37 to move downwardly which movement will cause the rake teeth to move upwardly and deposit their load upon the fire.

It will thus be seen that I have provided a very useful rake, and one which is applicable to various conditions found in the usual field.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, a frame, ground engaging wheels mounted therebelow, T shaped members pivoted to said frame, rake teeth pivotally mounted on said T shaped members and at a point remote from said frame, and means for varying the pivotal connection between said frame and said T shaped member.

2. In a rake of the character described, a frame, extensible drafting means secured to said frame, T shaped members pivoted to said frame and extending rearwardly therefrom, a tubular shaft turnably mounted on the rear extremities of said T shaped members, and means for turning said shaft through the action of said drafting means.

3. In a rake of the character described, a series of teeth, said teeth being mounted upon a turnable shaft, means for controlling the turning of said shaft, said means comprising a substantially U shaped frame secured thereto, latches mounted on said U shaped frame and adapted to engage T shaped members, a bifurcated member secured to said shaft, a yoke pivoted to said bifurcated member, a draft bar longitudinally movable in said yoke, lugs formed on said draft bar and adapted to engage said yoke, extensions formed on said draft bar at a point substantially midway thereof, and means for engaging said extensions for the purpose of preventing movement of said draft bar with relation to said yoke.

4. In a rake, the combination with a frame having wheels mounted therebeneath, of T shaped members pivotally secured to said frame, guides slidably mounted on said T shaped members, links secured to said guides and to said frame at points adjacent said wheels, means for causing movement of said guides with respect to said T shaped members, a shaft turnably mounted on the rear extremities of said T shaped members, teeth removably secured to said shaft, a U shaped frame rigidly secured to said shaft, means associated with said U shaped member for temporarily locking said frame to said shaft, a yoke pivoted thereto, a draft bar movable within said yoke, lugs formed on said draft bar and adapted to contact said yoke for the purpose of imparting motion to said shaft, and means for preventing movement of said draft bar with respect to said yoke, substantially as and for the purpose described.

In testimony whereof I affix my signature.

GOVERT C. GROENEVELD.